United States Patent [19]
Cox et al.

[11] Patent Number: 5,691,192
[45] Date of Patent: Nov. 25, 1997

[54] BIOLOGICAL FILTER FOR REMOVING VOLATILE HYDROPHOBIC COMPOUNDS FROM GAS EMISSIONS

[75] Inventors: Hubertus Henricus Jacobus Cox, Nootdorp; Harmannus Johannes Doddema, Delft, both of Netherlands

[73] Assignee: Nederlandse Organisatie voor Toegepast Natuurwetenschappelijk Onderzoek - TNO, Delft, Netherlands

[21] Appl. No.: 586,729

[22] PCT Filed: Jun. 13, 1994

[86] PCT No.: PCT/EP94/01927

§ 371 Date: Mar. 15, 1996

§ 102(e) Date: Mar. 15, 1996

[87] PCT Pub. No.: WO95/03116

PCT Pub. Date: Feb. 2, 1995

[30] Foreign Application Priority Data

Jul. 22, 1993 [NL] Netherlands .......................... 9301289

[51] Int. Cl.$^6$ ................ C12M 1/14; C12S 5/00
[52] U.S. Cl. ............. 435/282.5; 435/266; 435/299.1
[58] Field of Search .................... 435/266, 262, 435/262.5, 176, 289.1, 290.1, 299.1; 210/150

[56] References Cited

U.S. PATENT DOCUMENTS 3,216,905  11/1965  Baptist .
4,734,111  3/1988  Hoffmann et al. ................ 435/266
4,806,148  2/1989  Ottengraf ........................... 43/526

FOREIGN PATENT DOCUMENTS

| 0 085 757 | 8/1983 | European Pat. Off. . |
| 0 142 872 | 5/1985 | European Pat. Off. . |
| 0 413 638 | 2/1991 | European Pat. Off. . |
| 0 497 214 | 8/1992 | European Pat. Off. . |
| 38 07 033 | 9/1989 | Germany . |
| 60-055952 | 4/1985 | Japan . |
| 61-141917 | 6/1986 | Japan . |

OTHER PUBLICATIONS

Cox et al. "Growth of the black yeast *Exophiala jeanselmei* on styrene and styrene-related compounds." Applied Microbiology and Biotechnology. vol. 39 (Jun. 1993), pp. 372–376.

Cox et al. "Enrichment of Fungi and Degradation of Styrene in Biofilters." Biotechnology Letters. vol. 15 (Jul. 1993), pp. 737–742.

*Primary Examiner*—William H. Beisner
*Attorney, Agent, or Firm*—Young & Thompson

[57] ABSTRACT

Biological filter for removing volatile, hydrophobic compounds, such as toxic styrene, from gas emissions. These are broken down with a fungus, which is immobilized on a carrier of inert material, such as perlite. Preferably active carbon is also added. The filter is manufactured by cultivating the fungus on the carrier with the aid of the compound which is to be removed. In order to be able to make a filter quickly with a homogeneous distribution of the fungus therein, it is preferable to use a spore forming fungus.

8 Claims, No Drawings

BIOLOGICAL FILTER FOR REMOVING VOLATILE HYDROPHOBIC COMPOUNDS FROM GAS EMISSIONS

FIELD OF THE INVENTION

The invention relates to a biological filter for the removal of volatile, hydrophobic compounds from gas emissions, whereby the gas emission is passed through the filter, in which those compounds are broken down with the aid of a fungus (fungi) which is (are) present on a bearer material.

BACKGROUND OF THE INVENTION

In industrial gas emissions such compounds often occur; they are polluting for the environment and are not permitted on the grounds of national environmental laws, or are only permitted in very limited quantities. They must therefore be removed from the gas emission and broken down. For example, the toxic styrene occurs in concentrations of up to approximately 1 gr/m$^3$ in gas emissions of factories which manufacture (poly)styrene and reinforced plastic.

A known technique for catching and breaking down such compounds is with the aid of biological filters, filled with compost. Micro-organisms are present on the compost particles, which achieve the desired breakdown.

It turns out that such compost filters only work with a pH of between 5 and 9 and in the event of a high water capacity, corresponding with a water content of 40 to 60%. Further the demands were made of the filters that the drop in pressure across the filter is slight, that the gas is distributed homogeneously across the filter, whereby there is no case of channel-forming, and that the bearer material for the micro-organisms holds water well and absorbs the volatile compounds.

Problems in the use of the compost filters are, that during use the pH and the water capacity/the water content must be continuously checked and kept at the right level. Furthermore, it appears that the filter is unstable when used for the said hydrophobic compounds: it only works during a relatively short time—several weeks. And the mass transport of the gas to the water phase is small, so that the filter has a low volumetric elimination capacity.

A solution could be to achieve the breaking down of the compounds especially with the aid of fungi which break down those compounds. For example, in the case of the breaking down of styrene, with the aid of "Exophiala jeanselmei" as described in Appl. Microbiol. Biotechnol (1993) 39:372–376. Such fungi also work at a relatively low pH, for example pH=3, and with a relatively low water capacity. Furthermore, the active surface of the fungi mycelia in the gas phase is large and, as a result of the fact that a low water content is possible, the mass transport of the hydrophobic compounds can be higher. The fungi can be cultivated, for example, on compost; see, for example, the patent publication DE 3807033.

However, it appears that on the grounds of further essential qualities for such a filter (the pressure drop across the filter, the homogeneity of the distribution of the gas across the filter, the capacity to hold water to a sufficient degree and the absorption effect) such a filter also only works sufficiently during a very limited time.

SUMMARY OF THE INVENTION

The latter is solved according to the invention by choosing a bearer material which consists of particles of an inert, inorganic or an organic material, which holds water well. Especially good representatives of such materials are: perlite and vermiculite.

The use of perlite in order to cultivate micro-organisms is as such known from the Japanese patent publication J 61141917—however, not in a filter and in combination with a fungus as referred to here.

DETAILED DESCRIPTION OF THE INVENTION

With a filter according to the invention, in which perlite acted as the bearer material, the following results were achieved when removing styrene from a gas emission: the gas emission contained 800 mg styrene/m$^3$. A quantity of 120 m$^3$ per m$^3$ filter per hour was passed for 70 days through the filter, which was moistened regularly and whose pH had dropped to 3 after 15 days, and this value remained during the rest of the time. The elimination capacity amounted to 80 gr. styrene per m$^3$ filter per hour. This is 1.5 times to 7 times higher than what is achieved with a compost filter and furthermore: the effective duration of the filter is considerably higher.

The adhesive qualities of the bearer material can be further improved if, according to a further aspect of the invention, active carbon is added to it.

The invention also contains a method for the manufacture of a biological filter according to the invention. That method is characterized by the fact, that the filter material is enriched with the desired fungus(i) by, after adding the bearer material, inserting an earth suspension and passing gas through the filter which contains the compound which is to be removed.

For example, a styrene/air mixture was passed through a biofilter, with perlite as the bearer material on which an earth suspension had been placed, with an average flow of 45 l/hour and a concentration of 250 mg styrene per m$^3$. The styrene concentration in the gas was increased after 110 days to an average of 675 mg/m$^3$. It appeared that after approximately 4 weeks it could be determined that a biological mass was forming. In order to have the filter function in an optimal manner it is advantageous to cultivate the biological mass via a gas flow, which contains the compound which is to be removed in a concentration which is comparable to that of the gas emission which is to be purified.

The manufacture of a filter as referred to here can be accelerated and the result can be improved as far as homogeneity is concerned by working with a spore forming fungus. A homogenous 'occupation' of the filter can also be achieved by using bud-forming as occurs in fungi.

The invention also includes the method for removing the compounds concerned from gas emissions, with the aid of a filter according to the invention.

While the water content with the use of filters according to the invention is no longer as critical as in the case of compost filters, and even a low water content can have advantages with regard to the mass transport, nevertheless the filter will have to be regularly provided with water during its operation. And in order to ensure that the growth conditions of the fungus(i) continue to be maintained, a mixture of, for example, vitamins, minerals and ammonium chloride in a sodium phosphate buffer with a pH of, for example, 5.7, is regularly, for example every three days, added to the filter material.

We claim:

1. Device for the removal of volatile, hydrophobic compounds from gas emissions comprising a biological filter consisting of a carrier material provided with a biologically active material, wherein the carrier material consists of porous particles of a hydrophilic material, the biologically active material comprises a fungus covering the porous particles, the particles encase pores which provide a passage to said gas emissions and an acid environment resides in said filter.

2. Device as claimed in claim 1, wherein said carrier material consists of perlite grains.

3. A device as claimed in claim 1, wherein a certain amount of active carbon is mixed with the carrier material.

4. A device as claimed in claim 1, wherein said fungus covering the porous particles consists of Exophiala Jeanselmei.

5. Method of manufacturing a biological filter for removing volatile hydrophobic compounds from gas emissions, which comprises: placing porous particles of hydrophilic material in a suitable container, said porous particles being covered by a biologically active fungus, adding a soil suspension to the container, passing a gas, containing the hydrophobic compound which is to be removed, through the container, and providing an acid environment in said container.

6. Method according to claim 5, wherein said gas is the gas emission to be treated.

7. Method according to claim 5, wherein the added soil suspension contains a spore forming or bud forming fungus.

8. Method of removing volatile hydrophobic compounds from a gas emission, which comprises:

providing a biological reactor containing a biological filter consisting of porous particles of hydrophobic material, said porous particles being covered by a biologically active fungus, and passing the gas emission through the biological reactor so as to remove the volatile hydrophobic compounds from the gas emission.

* * * * *